United States Patent
Jun

(10) Patent No.: US 11,787,084 B2
(45) Date of Patent: Oct. 17, 2023

(54) METHODS OF MANUFACTURING A DANDELION LATEX SHOE COMPONENT

(71) Applicant: Cole Haan LLC, Greenland, NH (US)

(72) Inventor: Xiao Jun, Dongguan (CN)

(73) Assignee: COLE HAAN LLC, Greenland, NH (US)

( * ) Notice: Subject to any disclaimer, the term of this patent is extended or adjusted under 35 U.S.C. 154(b) by 0 days.

(21) Appl. No.: 18/120,718

(22) Filed: Mar. 13, 2023

(65) Prior Publication Data

US 2023/0294327 A1  Sep. 21, 2023

(51) Int. Cl.
- *B29B 7/82* (2006.01)
- *B29D 35/00* (2010.01)
- *B29B 7/00* (2006.01)

(52) U.S. Cl.
CPC .............. *B29B 7/823* (2013.01); *B29B 7/002* (2013.01); *B29D 35/0009* (2013.01); *B29D 35/0054* (2013.01)

(58) Field of Classification Search
CPC .... B29D 35/142; B29D 35/14; B29D 35/122; B29D 35/12; B29D 35/0009; B29C 33/405; B29C 33/40; B29B 7/002; B29B 7/823

See application file for complete search history.

(56) References Cited

U.S. PATENT DOCUMENTS

| | | |
|---|---|---|
| 6,818,676 B2 | 11/2004 | Koffler et al. |
| 8,940,849 B2 | 1/2015 | Feher et al. |
| 9,346,924 B2 | 5/2016 | Wade et al. |
| 9,611,363 B2 | 4/2017 | Swiger et al. |
| 9,681,757 B2 | 6/2017 | Svensrud |
| 10,184,029 B2 | 1/2019 | Swiger et al. |
| 10,584,185 B2 | 3/2020 | Nocera, Jr. et al. |
| 11,028,236 B2 | 6/2021 | Hruschka et al. |
| 2003/0182820 A1 | 10/2003 | Fuerst et al. |
| 2006/0225144 A1 | 10/2006 | Hallahan et al. |
| 2010/0251565 A1 | 10/2010 | Litchfield et al. |
| 2011/0016635 A1 | 1/2011 | Svensrud |
| 2011/0275142 A1 | 11/2011 | Wade et al. |
| 2012/0040118 A1 | 2/2012 | Doyle et al. |
| 2014/0288255 A1 | 9/2014 | Martin et al. |
| 2015/0071978 A1 | 3/2015 | Chang |

(Continued)

FOREIGN PATENT DOCUMENTS

| | | |
|---|---|---|
| CN | 104865225 A | 8/2015 |
| CN | 110628043 A | 12/2019 |

(Continued)

*Primary Examiner* — Stella K Yi
(74) *Attorney, Agent, or Firm* — Thompson Coburn LLP

(57) ABSTRACT

A method of manufacturing a dandelion latex shoe component. Dandelion rubber, CIS polybutadiene rubber (BR), and butadiene styrene rubber (SBR) are mixed together to form a first mixture. The dandelion rubber, CIS polybutadiene rubber (BR), and butadiene styrene rubber (SBR) are mixed at a temperature not less than 60° Celsius and not greater than 80° to form the first mixture. Silicon dioxide is then mixed with the first mixture to form a second mixture. The silicon dioxide is mixed with the first mixture at a temperature not less than 80° Celsius and not greater than 100° Celsius to form the second mixture. The dandelion latex shoe component is then formed from at least the second mixture via a molding process.

18 Claims, 1 Drawing Sheet

(56) References Cited

U.S. PATENT DOCUMENTS

| | | | |
|---|---|---|---|
| 2016/0135543 A1 | 5/2016 | Anceresi et al. | |
| 2016/0297953 A1 | 10/2016 | Cornish et al. | |
| 2019/0276626 A1 | 9/2019 | Baghdadi | |
| 2020/0140662 A1* | 5/2020 | York | C08J 3/203 |
| 2020/0275739 A1 | 9/2020 | Linkfield et al. | |
| 2021/0079186 A1 | 3/2021 | Baghdadi et al. | |
| 2022/0259413 A1 | 8/2022 | Hengesbach et al. | |

FOREIGN PATENT DOCUMENTS

| | | |
|---|---|---|
| CN | 110643051 A | 1/2020 |
| CN | 110885479 A | 3/2020 |
| CN | 111443146 A | 7/2020 |
| CN | 111808297 A | 10/2020 |
| WO | 2002068515 A1 | 9/2002 |

* cited by examiner

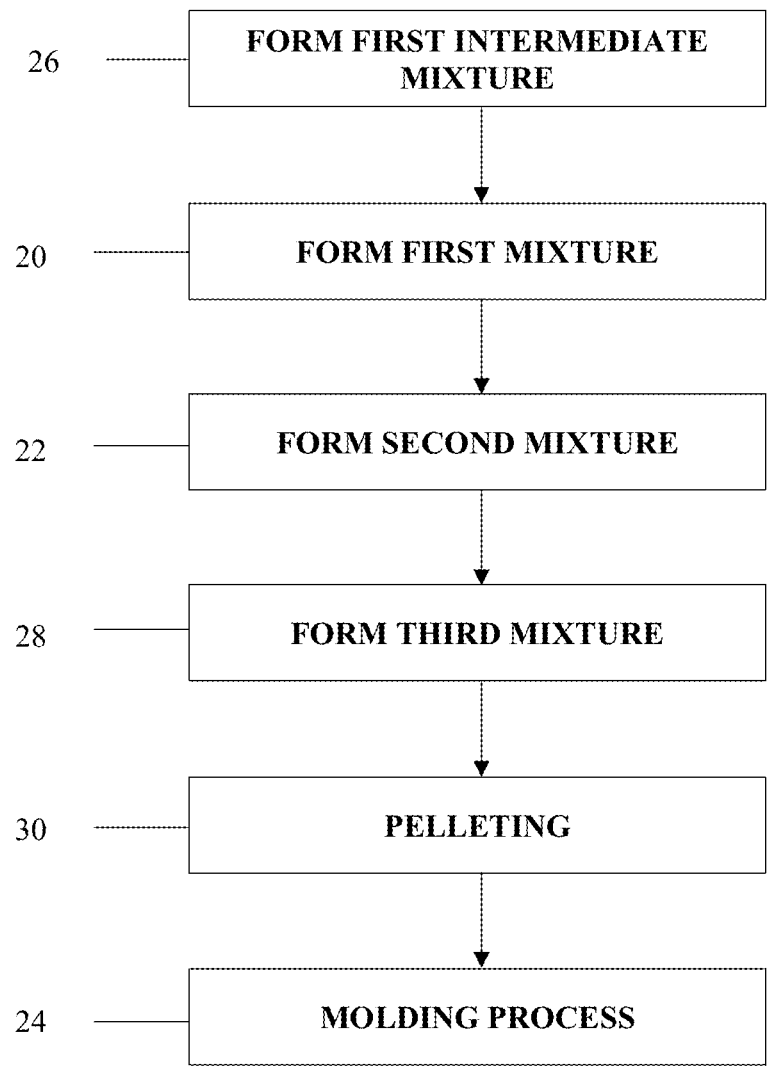

METHODS OF MANUFACTURING A DANDELION LATEX SHOE COMPONENT

Cross-Reference to Related Applications

This application claims priority to Chinese Application No. CN 202210260557.3, filed Mar. 16, 2022, the disclosure of which is incorporated by reference herein.

STATEMENT REGARDING FEDERALLY SPONSORED RESEARCH OR DEVELOPMENT

Not Applicable.

APPENDIX

Not Applicable.

BACKGROUND OF THE INVENTION

FIELD OF THE INVENTION

This invention pertains to methods of manufacturing a dandelion latex shoe component.

SUMMARY

One aspect of the disclosure is a method of manufacturing a dandelion latex shoe component. Dandelion rubber, CIS polybutadiene rubber (BR), and butadiene styrene rubber (SBR) are mixed together to form a first mixture. The dandelion rubber, CIS polybutadiene rubber (BR), and butadiene styrene rubber (SBR) are mixed at a temperature not less than 60° Celsius and not greater than 80° to form the first mixture. Silicon dioxide is then mixed with the first mixture to form a second mixture. The silicon dioxide is mixed with the first mixture at a temperature not less than 80° Celsius and not greater than 100° Celsius to form the second mixture. The dandelion latex shoe component is then formed from at least the second mixture via a molding process.

Another aspect of the disclosure is a method of manufacturing a dandelion latex shoe component. Dandelion rubber is mixed with BR to form a first intermediate mixture. The first intermediate mixtures is mixed with SBR to make a first mixture. The first mixture is mixed with silicon dioxide to form a second mixture. The second mixture is mixed with or more of zinc oxide, 2,2'-dithiobisbenzothiazole (DM), sulfur, and blowing agent to form a third mixture. The dandelion rubber comprises at least 10-74% by weight of the third mixture. The BR comprises at least 10-70% by weight of the third mixture. The SBR comprises at least 10-40% by weight of the third mixture. The silicon dioxide comprises at least 5-30% by weight of the third mixture. The dandelion latex shoe component is then formed from the third mixture via a molding process.

Further features and advantages, as well as the operation, are described in detail below with reference to the accompanying drawings.

BRIEF DESCRIPTION OF THE DRAWINGS

FIG. 1 is a flow diagram of an embodiment of a method of manufacturing a dandelion latex shoe component.

Reference numerals in the written specification and in the figure indicate corresponding items.

DETAILED DESCRIPTION

FIG. 1 is a flow diagram of an embodiment of a method of manufacturing a dandelion latex shoe component. Referring to reference number 20, the method comprises forming a first mixture. The first mixture is formed by mixing together dandelion rubber, CIS polybutadiene rubber (BR), and butadiene styrene rubber (SBR) at a temperature not less than 60° Celsius and not greater than 80° Celsius. As used herein, dandelion rubber refers to either dandelion latex foam material or dandelion latex non-foam material that is made at least partially from dandelion latex. Referring to reference number 22, the method further comprises forming a second mixture. The second mixture is formed by mixing silicon dioxide with the first mixture at a temperature not less than 80° Celsius and not greater than 100° Celsius. Referring to reference number 24, the method further comprises forming a shoe component from at least the second mixture via a molding process, as shown in FIG. 1 by the step designated 24.

The molding process may be either an injection molding process or a compression molding process. The injection molding process has a heating time of 360-800 seconds, a heating temperature of not less than 150° Celsius and not greater than 170° Celsius, and a molding time of 500-800 seconds. The injection molding process may further comprise heating the material in an injection gun to a temperature not less than 50° Celsius and not greater than 80° Celsius prior to injection. The compression molding process has a heating time of 360-800 seconds, a heating temperature of not less than 150° Celsius and not greater than 170° Celsius, and a cooling time of 360-800 seconds.

The method may comprise forming a first intermediate mixture, indicated at 26, and then forming the first mixture from at least the first intermediate mixture. The first intermediate mixture may be formed by mixing dandelion rubber with BR to make the first intermediate mixture. In such cases, forming the first mixture, indicated at 20, is accomplished by mixing SBR with the first intermediate mixture. Alternatively, the first intermediate mixture may be formed by mixing dandelion rubber with SBR to form the first intermediate mixture, as indicated at 26. In such cases, forming the first mixture is accomplished by mixing BR with the first intermediate mixture.

The method may also comprise forming a third mixture, indicated at 28, before the molding process. The third mixture is formed by mixing the second mixture with one or more of zinc oxide, 2,2'-dithiobisbenzothiazole (DM), sulfur, and a blowing agent. In the case that a third mixture is formed, forming a shoe component from at least the second mixture is accomplished via a molding process comprising forming a shoe component from at least the third mixture via a molding process.

The dandelion rubber comprises at least 10-74% by weight of the third mixture. The BR comprises 10-70% by weight of the third mixture. The SBR comprises 10-40% by weight of the third mixture. The silicon dioxide comprises 5-30% by weight of the third mixture.

The zinc oxide may comprise 5-8% by weight of the third mixture. The DM may comprise 2-3% by weight of the third mixture. The sulfur may comprise 2-3% by weight of the third mixture. The blowing agent may comprise 1-3% by weight of the third mixture.

In order to make the first intermediate mixture, the first mixture, the second mixture, and the third mixture, the mixing processes occur until the respective mixture is homogenous. The mixtures may be formed by way of any suitable mixing machine, such as a Model 75 mixing machine manufactured by Wuxi Yangming Rubber Machinery Co., Ltd. The mixing machine may have a rotor speed of 60-80 RPM, a screw diameter of 110 mm, and a screw length of 110 mm. For a 75 liter mixing machine having a rotor temperature of 80° Celsius and a rotor speed of 60-80 RPM, mixing may be accomplished in approximately 15 minutes. The exact mixing time required for mixing, however, will depend on the volume of material being mixed, the temperature the mixing is occurring at, and the equipment used. For instance, the mixing time may be between 5 and 45 minutes depending on the above variables.

Elasticity, hardness, and durability depend on the component percentages. For example 50% dandelion latex material allows for a high rebound and light-weight midsole. Higher percentages of dandelion rubber will increase the softness of the shoe component and increase cushioning.

Referring to reference number 30, the method may also comprise pelleting the third mixture before the molding process.

In an example of the method of the present embodiment, the method comprises forming the first intermediate mixture by mixing dandelion rubber with BR. A first mixture is then formed by mixing the first intermediate mixture with SBR. A second mixture is then formed by mixing silicon dioxide with the first mixture. A third mixture is then formed by mixing one or more of zinc oxide, DM, sulfur, and blowing agent with the second mixture.

In view of the foregoing, it should be appreciated that the invention has several advantages over the prior art.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of manufacturing a dandelion latex shoe component, the method comprising:
    mixing together dandelion rubber, CIS polybutadiene rubber (BR), and butadiene styrene rubber (SBR) at a temperature not less than 60° Celsius and not greater than 80° Celsius to form a first mixture;
    mixing silicon dioxide with the first mixture at a temperature not less than 80° Celsius and not greater than 100° Celsius to form a second mixture; and
    forming a shoe component from at least the second mixture via a molding process.

2. The method of claim 1 wherein mixing the dandelion rubber, BR, and SBR comprises:
    mixing dandelion rubber with BR to make a first intermediate mixture; and
    mixing SBR with the first intermediate mixture to form the first mixture.

3. The method of claim 1 wherein mixing the dandelion rubber, BR, and SBR comprises:
    mixing dandelion rubber with SBR to make a first intermediate mixture; and
    mixing the BR with the first intermediate mixture to form the first mixture.

4. The method of claim 1, further comprising:
    before the molding process, mixing the second mixture with one or more of zinc oxide, 2,2'-dithiobisbenzothiazole (DM), sulfur, and a blowing agent to form a third mixture;
    wherein said forming a shoe component from at least the second mixture via a molding process comprises forming a shoe component from at least the third mixture via a molding process.

5. The method of claim 4, further comprising:
    before the molding process, pelleting the third mixture; and
    wherein the molding process comprises an injection molding process.

6. The method of claim 4, further comprising:
    before the molding process, pelleting the third mixture; and
    wherein the molding process comprises a compression molding process.

7. The method of claim 4 wherein the dandelion rubber comprises 10-74% by weight of the third mixture, the BR comprises 10-70% by weight of the third mixture, the SBR comprises 10-40% by weight of the third mixture, the silicon dioxide comprises at least 5-30% by weight of the third mixture.

8. The method of claim 1, wherein the mixing of dandelion rubber, BR, and SBR occurs for approximately 5-45 minutes and the mixing of silicon dioxide with the first mixture occurs for approximately 5-45 minutes.

9. A method of manufacturing a dandelion latex shoe component, the method comprising:
    mixing dandelion rubber with BR to form a first intermediate mixture;
    mixing the first intermediate mixture with SBR to make a first mixture;
    mixing silicon dioxide with the first mixture to form a second mixture;
    mixing one or more of zinc oxide, DM, sulfur, and blowing agent with the second mixture to form a third mixture, the dandelion rubber comprising 10-74% by weight of the third mixture, the BR comprising 10-70% by weight of the third mixture, the SBR comprising 10-40% by weight of the third mixture, the silicon dioxide comprising at least 5-30% by weight of the third mixture; and
    forming a shoe component from the third mixture via a molding process.

10. The method of claim 9 wherein the zinc oxide comprises at least 5-8% by weight of the third mixture.

11. The method of claim 9 wherein the DM comprises at least 2-3% by weight of the third mixture.

12. The method of claim 9 wherein the sulfur comprises at least 2-3% by weight of the third mixture.

13. The method of claim 9 wherein the blowing agent comprises at least 1-3% by weight of the third mixture.

14. The method of claim 9 further comprising:
    before the molding process, pelleting the third mixture, and wherein the molding process comprises an injection molding process.

15. The method of claim 14 wherein the injection molding process has a heating time of 360-800 seconds, a heating temperature of not less than 150° Celsius and not greater than 170° Celsius, and a molding time of 500-800 seconds.

16. The method of claim 15 wherein the injection molding process comprises heating the material in an injection gun to a temperature not less than 50° Celsius and not greater than 80° Celsius prior to injection.

17. The method of claim 9 further comprising:
   before the molding process, pelleting the third mixture, and wherein the molding process is a compression molding process.

18. The method of claim 17 wherein the compression molding process has a heating time of 360-800 seconds, a heating temperature of not less than 150° Celsius and not greater than 170° Celsius, and a cooling time of 360-800 seconds.

* * * * *